(12) United States Patent
Dhavala et al.

(10) Patent No.: US 12,125,412 B2
(45) Date of Patent: Oct. 22, 2024

(54) SYSTEM AND METHOD FOR GENERATING DIAGNOSTIC ASSESSMENT QUESTION PAPERS AND EVALUATING THEIR QUALITY

(71) Applicant: INDIAVIDUAL LEARNING LIMITED, Karnatka (IN)

(72) Inventors: Soma Dhavala, Bangalore (IN); Keyur Faldu, Bangalore (IN); Aditi Avasthi, Bangalore (IN)

(73) Assignee: INDIAVIDUAL LEARNING LIMITED, Bangalore (IN)

( * ) Notice: Subject to any disclaimer, the term of this patent is extended or adjusted under 35 U.S.C. 154(b) by 629 days.

(21) Appl. No.: 17/378,117

(22) Filed: Jul. 16, 2021

(65) Prior Publication Data

US 2022/0020283 A1 Jan. 20, 2022

(30) Foreign Application Priority Data

Jul. 17, 2020 (IN) .............................. 202041030603

(51) Int. Cl.
*G09B 7/08* (2006.01)
*G06F 17/18* (2006.01)
(Continued)

(52) U.S. Cl.
CPC .............. *G09B 7/08* (2013.01); *G06F 17/18* (2013.01); *G06F 18/2132* (2023.01); *G06N 5/02* (2013.01);
(Continued)

(58) Field of Classification Search
CPC ... G09B 7/08; G09B 5/02; G09B 5/14; G09B 7/02; G06F 17/18; G06F 18/2132;
(Continued)

(56) References Cited

U.S. PATENT DOCUMENTS 10,854,099 B2 12/2020 Faldu et al.
2005/0260549 A1* 11/2005 Feierstein ................ G09B 7/02
434/236

(Continued)

OTHER PUBLICATIONS

Donda, Chintan, et al., "A framework for predicting, interpreting, and improving Learning Outcomes." arXiv preprint arXiv: 2010.02629 (2020.

(Continued)

*Primary Examiner* — Jeffrey S Vanderveen
(74) *Attorney, Agent, or Firm* — Maschoff Brennan

(57) ABSTRACT

System and method for generating diagnostic assessment question papers is disclosed. A diagnostic assessment question paper should be able to accurately estimate the ability level of the students for the skill set being evaluated and should be able to discriminate between learners of different abilities. In one embodiment, the system and method of the present disclosure selects questions from a question database based on constraints defined by a user, and ranks the selected questions based on policies, metadata of students, and diagnostic metadata of selected questions. Then the system selects a set of questions having higher ranks and evaluates for accuracy and discrimination measures and selects the set of questions for generating the diagnostic assessment question paper if the values for the accuracy and the discrimination measures are higher than predefined values of accuracy and discrimination. Else, the process is repeated with alternative constraints or policies or both.

8 Claims, 6 Drawing Sheets

(51) Int. Cl.
*G06F 18/2132* (2023.01)
*G06N 5/02* (2023.01)
*G06N 7/01* (2023.01)
*G09B 5/02* (2006.01)
*G09B 5/14* (2006.01)

(52) U.S. Cl.
CPC ................ *G06N 7/01* (2023.01); *G09B 5/02* (2013.01); *G09B 5/14* (2013.01)

(58) Field of Classification Search
CPC . G06F 40/30; G06N 5/02; G06N 7/01; G06N 3/08; G06N 5/022
See application file for complete search history.

(56) References Cited

U.S. PATENT DOCUMENTS

| | | |
|---|---|---|
| 2007/0172810 A1 | 7/2007 | McCallum |
| 2013/0224697 A1 | 8/2013 | McCallum et al. |
| 2015/0161903 A1 | 6/2015 | Colliander |
| 2015/0325138 A1* | 11/2015 | Selinger ................ G09B 19/00 434/322 |
| 2017/0084190 A1 | 3/2017 | Devlin |
| 2020/0312179 A1* | 10/2020 | Desai ...................... G09B 7/08 |

OTHER PUBLICATIONS

Indian Office Action dated Oct. 28, 2023 as received in application No. 202041030603.
IN Office Action dated Jun. 8, 2024 in application No. 202041030603.

* cited by examiner

SYSTEM AND METHOD FOR GENERATING DIAGNOSTIC ASSESSMENT QUESTION PAPERS AND EVALUATING THEIR QUALITY

PRIORITY STATEMENT

The present application hereby claims priority from Indian patent application number 202041030603 titled "System and Method for Generating Diagnostic Assessment Question Papers and Evaluating Their Quality", filed on Jul. 17, 2020, the entire contents of which are incorporated herein by reference.

TECHNICAL FIELD

The present invention generally relates to data analytics and content packaging, and more particularly to a system and method for generating diagnostic assessment question papers and evaluating their quality.

BACKGROUND

Education is a process of facilitating learning or acquisition of cognitive skills, knowledge, values, beliefs, and habits. Typically, the education process includes examinations or assessments intended to measure a learner's knowledge, skill, aptitude, etc., and are broadly categorized into standardized assessments and non-standardized assessments. The way an assessment paper of a given quality level is generated is described in detail in Indian patent application numbered 201941012257 and U.S. patent application Ser. No. 16/684,434 titled "System and method for generating an assessment paper and measuring the quality thereof" having priority date of: Mar. 28, 2019. The non-standardized assessments may further include, but not limited to, diagnostic assessment, formative assessment, and summative assessment, etc. Among various types of assessments, diagnostic assessment is a form of assessment that enables teachers or instructors to determine individual learner's strengths, weaknesses, knowledge, abilities, skills, and learning difficulties or problems, prior to instruction or teaching in general or prior to continuing instruction or teaching the next chapter or at any stage of the learning process. Typically, diagnostic assessments are conducted at the beginning of a course or at the beginning of a unit or topic or after teaching a part of the contents of the syllabus or after completion of teaching the contents of the syllabus, for diagnosing the individual learner difficulties, curriculum planning, for gaining an idea of what learners have learned in the previous or past learning period, and guiding the learners to achieve their goals, etc.

As described, diagnostic assessment plays a significant role in improving learning outcomes of each individual learner. Detailed analysis of learning theory including learning ability of the student, student's performance, and improvement on standardized test-based evaluations can be found in U.S. Pat. No. 10,854,099 titled: "Adaptive learning machine for score improvement and parts thereof" granted on Dec. 1, 2020, and publication (non-patent literature) Donda, Chintan, et al., "A framework for predicting, interpreting, and improving Learning Outcomes." arXiv preprint arXiv: 2010.02629 (2020). As each learner is unique, an instructor may design personalized learning paths for each learner, or a group of learners based on the results of diagnostic assessments. One technique for assessing the current skill level of a learner is to use a set of assessment challenges, most commonly taking the form of a question paper. Typically, such question papers (hereafter referred to as diagnostic assessment question paper) are generated manually by referring to previous or old question papers, question banks, syllabus, etc., for example. That is, teachers use their expertise to generate a diagnostic assessment question paper and if multiple teachers create multiple diagnostic assessment question papers, it may suffer from individual biases of teachers and fail to meet the purpose of a diagnostic question paper.

Further, to make right use of the diagnostic assessment results, the diagnostic assessment question paper should be able to accurately estimate the ability level of the learner for the skill set being evaluated and should be able to discriminate between learners of different abilities. Further, the diagnostic assessment question paper should be able to meet the above said objectives (accuracy and discrimination) using as small a number of questions as possible. However, manually generated diagnostic assessment question papers, based on the experience of one or more teachers, may not be able to meet the objectives of accuracy and discrimination satisfactorily. As described, manually generated diagnostic assessment question papers often fail to meet the objectives, may not be able to assess ability and provide meaningful information about one or more learners, and often suffer from individual biases of the teacher generating each.

BRIEF SUMMARY

This summary is provided to introduce a selection of concepts in a simple manner that is further described in the detailed description of the disclosure. This summary is not intended to identify key or essential inventive concepts of the subject matter nor is it intended for determining the scope of the disclosure.

To overcome at least one of the problems mentioned above, there exists a need for a system and a method for generating diagnostic assessment question papers to accurately estimate the ability level of the learners for the skill set being evaluated, and to discriminate between learners of different abilities.

The present disclosure discloses a method for generating a diagnostic assessment question paper based on one or more constraints defined by a user and policy selected by the user. The method comprises, receiving one or more constraints from a user, selecting questions from a plurality of questions stored in a question database, the selection based on attributes associated with each question and the one or more received constraints, receiving one or more policies selected by the user, wherein the one or more policies include a baseline policy, a discrimination policy, a discrimination and behavioral policy, ranking the selected questions based on the one or more policies selected by the user, metadata of students, and diagnostic metadata of selected questions, selecting a set of questions having higher ranks, evaluating the set of questions for accuracy and discrimination measures, wherein the evaluation comprises computing values of accuracy and discrimination measures for the set of questions, and generating the diagnostic assessment question paper by selecting the set of questions, if the values for the accuracy and the discrimination measures are higher than predefined values of accuracy and discrimination.

Also disclosed is a system for generating a diagnostic assessment question paper, wherein the system comprises, a constraint analyser module configured for receiving one or more constraints from a user device associated with a user and one or more policies selected by the user, a question selection module configured for selecting one or more questions from a plurality of questions stored in a question database, the selection is based on attributes associated with each question and the one or more received constraints, a ranking module configured for, ranking the selected questions based on the one or more policies selected by the user, metadata of students, and diagnostic metadata of selected questions, selecting a set of questions having higher ranks, an evaluation module configured for, evaluating the set of questions for accuracy and discrimination measures, wherein the evaluation comprises computing values of accuracy and discrimination measures for the set of questions, comparing the computed values for the accuracy and the discrimination measures with predefined values of accuracy and discrimination, and a question paper generation module configured for generating the diagnostic question paper by including the set of question.

To further clarify advantages and features of the present disclosure, a more particular description of the disclosure will be rendered by reference to specific embodiments thereof, which is illustrated in the appended figures. It is to be appreciated that these figures depict only typical embodiments of the disclosure and are therefore not to be considered limiting of its scope. The disclosure will be described and explained with additional specificity and detail with the accompanying figures.

Figure 1:
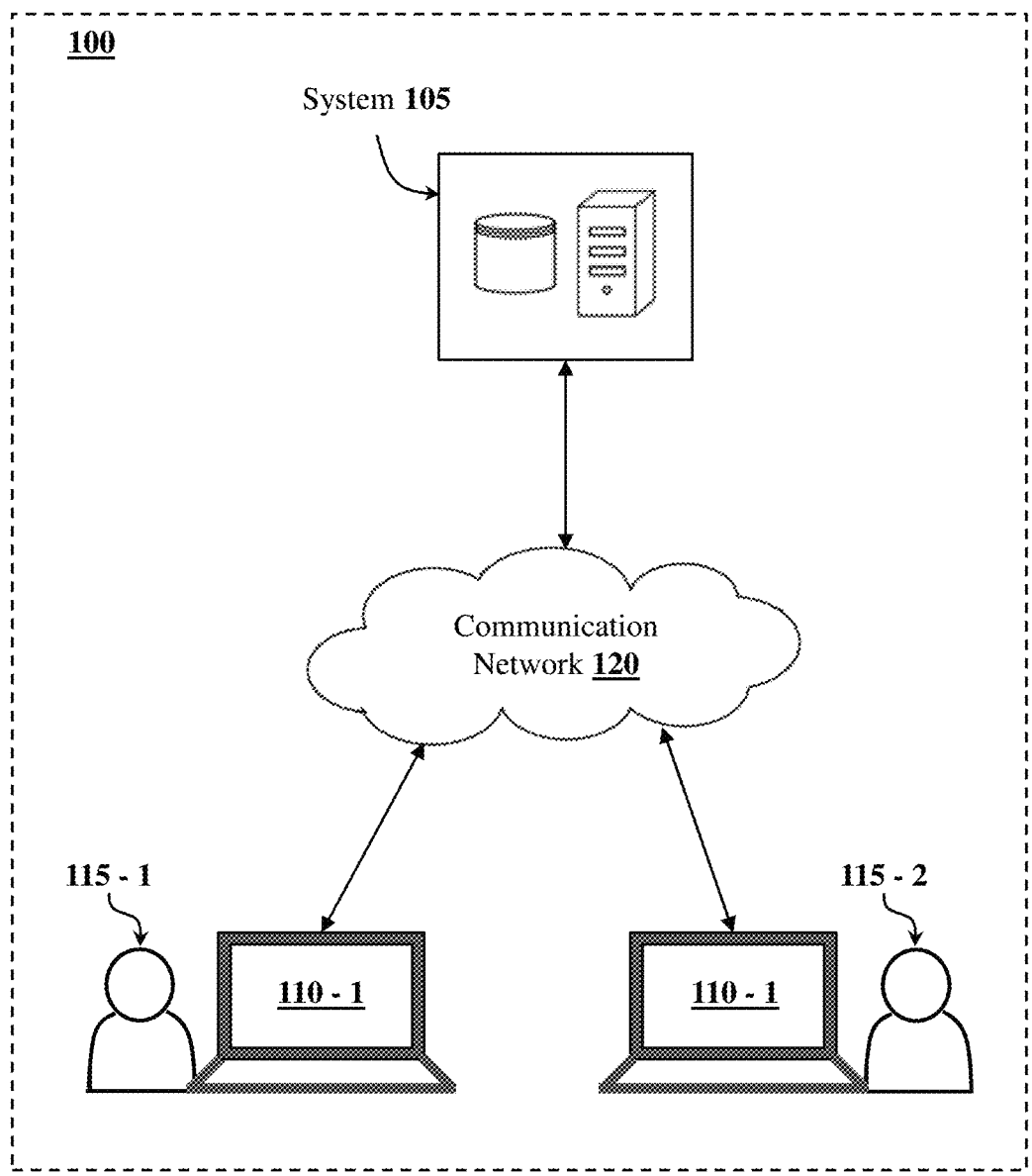
FIG. 1 illustrates an exemplary network environment 100 implementing a system for generating diagnostic assessment question papers in accordance with an embodiment of the present disclosure.

Further, persons skilled in the art to which this disclosure belongs will appreciate that elements in the figures are illustrated for simplicity and may not have been necessarily drawn to scale. Furthermore, in terms of the construction of the joining ring and one or more components of the bearing assembly may have been represented in the figures by conventional symbols, and the figures may show only those specific details that are pertinent to understanding the embodiments of the present disclosure so as not to obscure the figures with details that will be readily apparent to those of ordinary skill in the art having benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

In the present disclosure, relational terms such as first and second, and the like, may be used to distinguish one entity from the other, without necessarily implying any actual relationship or order between such entities.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more elements or structures or components preceded by "comprises . . . a" does not, without more constraints, preclude the existence of other elements, other structures, other components, additional devices, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The components, methods, and examples provided herein are illustrative only and not intended to be limiting.

Embodiments of the present disclosure will be described below in detail with reference to the accompanying figures.

Embodiments of the present disclosure disclose a system and a method for generating diagnostic assessment question papers and evaluating their quality. The term diagnostic assessment question paper as described herein refers to a set of questions or a question paper which may be used for determining individual learner's strengths, weaknesses, knowledge, abilities, skills, and learning difficulties or problems prior to instruction or teaching.

As described in the background section, a diagnostic assessment question paper should be able to accurately estimate the ability level of the learners for the skill set being evaluated, should be able to discriminate between learners of different abilities, and should be able to meet the above said objectives (accuracy and discrimination) using as small a number of questions as possible. In one embodiment, the system and method disclosed in the present disclosure achieves the said objectives by selecting by a user and one or more policies selected by the user, wherein the one or more policies include and ranking questions based on one or more constraints defined a baseline policy, a discrimination policy, a discrimination and behavioral policy, Then a set of questions having higher ranks, are selected and evaluated for accuracy and discrimination measures, and a diagnostic assessment question paper is generated if the values of the accuracy and discrimination measures are higher than predefined values of accuracy and discrimination. It is to be noted that the user may be any person who is interested in generating the diagnostic assessment question paper.

FIG. 1 illustrates an exemplary network environment 100 implementing a system for generating diagnostic assessment question papers in accordance with an embodiment of the present disclosure. As shown, the network environment 100 comprises a system 105 configured for generating the diagnostic assessment question papers, a plurality of user devices 110-1 and 110-2 (only two user devices are shown and referred to hereafter as user device 110) associated with a plurality of users 115-1 and 115-2, and a communication network 120, wherein the system 105 is communicatively connected to the plurality of user devices 110-1 and 110-2 via the communication network 120.

The system 105 for generating the diagnostic assessment question papers may include, for example, a mainframe computer, a computer server, a network of computers, or a virtual server which provides functionalities and services to other programs or devices such as the user device 110. In one implementation, the system 105 is a cloud server comprising one or more processors, associated processing modules, interfaces, and storage devices communicatively interconnected to one another through one or more communication means for communicating information. The storage associated with the system 105 may include volatile and non-volatile memory devices for storing information and instructions to be executed by the one or more processors and for storing temporary variables or other intermediate information during processing.

In one embodiment of the present disclosure, the system 105 is configured for generating the diagnostic assessment question papers by selecting and ranking questions from a plurality of questions stored in a question database. In one implementation, the system 100 selects the questions based on one or more constraints received from a user and one or more attributes associated with the questions stored in a question database. The selected questions are ranked based on one or more policies selected by the user, metadata of students, and diagnostic metadata of selected questions (stored in a database). A set of questions having higher ranks are selected. This set of questions forms a question paper. Then, the set of questions are evaluated for accuracy and discrimination measures, wherein the evaluation comprises computation of values of accuracy and discrimination measures for the set of question, that is, the question paper. The question paper is selected as a diagnostic assessment question paper if the values of the accuracy and the discrimination measures are higher than predefined values of accuracy and discrimination. Else, that is, if the set of questions fail to meet the accuracy and discrimination measures, feedback is given to the user and the process is repeated considering the alternative policy selected by the user or considering alternative constraints received from the user or both. The manner in which the question database is built and the system 100 performs the one or more functions for generating a diagnostic assessment question paper is described in further detail below.

The user device 110 may be any computing device that often accompanies their users 115 to perform various activities. By way of example, the user device 110 may include, but no limited to, a computer, a laptop, a notebook computer, a tablet, and a smartphone, having communication capabilities. The user may be a teacher or an instructor who wants to conduct a diagnostic assessment on one or more students. The user device 110 may communicate with the system 105 through the communication network 120 in one or more ways such as wired, wireless connections or a combination thereof. It will be appreciated by those skilled in the art that the user device 110 comprises one or more functional elements capable of communicating through the communication network 120 to receive one or more services offered by the system 105. In one embodiment of the present disclosure, a user (an instructor or a teacher) may use a dedicated application or web interface for accessing the system 105 and hence for generating the diagnostic assessment question papers. In one implementation, the user may install the application which provides interfaces for defining the one or more constraints and for selecting the one or more policies, and for triggering the process of automated generation of diagnostic assessment question papers.

The communication network 120 may be a wireless network or a wired network or a combination thereof. Wireless network may include long range wireless radio, wireless personal area network (WPAN), wireless local area network (WLAN), mobile data communications such as 3G, 4G or any other similar technologies. The communication network 120 may be implemented as one of the different types of networks, such as intranet, local area network (LAN), wide area network (WAN), the internet, and the like. The communication network 120 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Further the communication network 120 may include a variety of network devices, including routers, bridges, servers, modems, computing devices, storage devices, and the like. In one implementation, the communication network 120 is internet which enables communication between the system 105 and the plurality of user devices 110.

Figure 2:
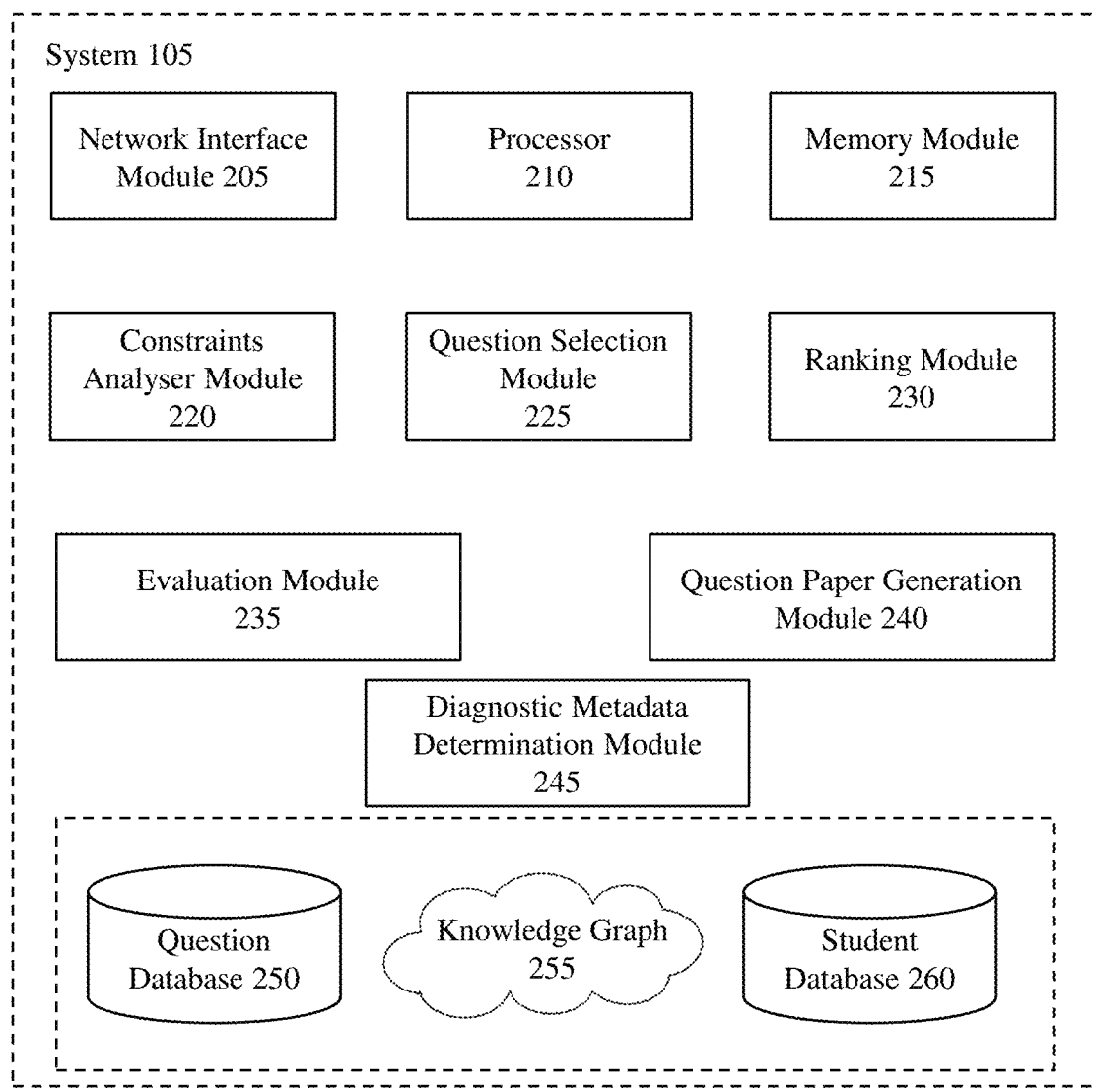
FIG. 2 is a block diagram of the system for generating the diagnostic assessment question paper in accordance with an embodiment of the present disclosure.

As described, the system 105 is configured for generating the diagnostic assessment question papers by selecting and ranking the questions from the question database. FIG. 2 is a block diagram of the system for generating the diagnostic assessment question paper in accordance with an embodiment of the present disclosure. As shown, the system 105 comprises a network interface module 205, a processor 210, a memory module 215, a constraint analyser module 220, a question selection module 225, a ranking module 230, an evaluation module 235 a question paper generation module 240 and a diagnostic metadata determination module 245. The system 105 further comprises a question database 250, a knowledge graph 252 and a student database 260, wherein the said databases may be a part of the system 105 or external to the system 105 and communicatively connected via the communication network 120.

The network interface module 205 enables communication between the system 105 and various other devices through the communication network 120. The memory module 215 may include volatile and non-volatile memory devices for storing information and instructions to be executed by the processor 210 and for storing temporary variables or other intermediate information during processing.

In one embodiment of the present disclosure, the database 250 comprises a plurality of questions including, but not limited to, questions from textbooks, questions by individuals or institutions, questions that have appeared in tests and examinations, etc. Further, the database 250 is stored with a plurality of attributes associated with each question and value(s) associated with each of the plurality of attributes. It is to be noted that the questions may be stored in different categories (based on syllabus, grade, subject, etc.) and in a suitable manner in the database 250. The plurality of attributes associated with one or more questions may include, but not limited to, question type, difficulty level, ideal time, chapter identifier, concepts, bloom level, learning slope, one or more lexical features, one or more cognitive features, guessing factor, etc. "Table 1" lists exemplary attributes and descriptions of the same.

TABLE 1

| Attributes | Description |
| --- | --- |
| Difficulty Level | A question may be assigned difficulty level of 1 to 10 with 1 indicating "Easy" and 10 indicating "Difficult". |
| Question Type | Single choice, multiple choice, matrix questions, numerical question, etc. |
| Ideal Time | Ideal time to solve a question is defined as time required by an achiever student to solve the given question. |
| Chapter ID | The chapter identifier for a given question. It is to be noted that chapter identifier may differ depending on the context of the exam the question belongs to. |
| Concepts | Concept knowledge required to solve a given question. These concepts are tied to knowledge graph. |
| Bloom Level | Bloom level of a question. Knowledge, Comprehension, Application, Analysis, Synthesis, and Evaluation. |
| Learning Slope | Learning slope may determine the difficulty of questions by achiever students versus the other students. This helps in identifying "tricky questions". |
| Lexical features | Length of a question, complexity of a question, inclusion of equations. |
| Cognitive Features | Inclusion of other cognitive capabilities such as a graph, a picture, etc. |
| Guessing Factor | Likelihood of a guess being the correct answer. |

In one example, a question may have an attribute "Chapter ID" and the value may be "2" indicating "second chapter". Similarly, the same question may have other attributes and values such as "Question Type" with value "2" indicating multiple choice question, "Difficulty Level" with value "8", "Bloom Level" with value "2" indicating "Comprehension", etc. Hence, the question database 250 comprises the plurality of questions and the one or more attributes associated with the plurality of questions.

The student database 260 is stored with metadata of students who attempted the questions stored in the question database 250. In one embodiment, the metadata includes, but not limited to, data on the correctness of students' past responses to the questions stored in the question database 250 and data on students' behavior while attempting the question. The behavioral data may include, but not limited to, careless mistakes or wasted attempts, overtime incorrect attempts, overtime correct attempts, percentage time spent on non-attempts, etc. In one implementation, the one or more behavioral attributes are determined using activity data of the users (students) and the context of the activity and the behavioral data is tagged with the questions stored in the question database 250. The way the behavioral attributes are determined is described in detail in the Indian patent application numbered "201941012400" entitled "System and Method for Behavioural Analysis and Recommendations" filed on Mar. 29, 2019, the relevant content of which is incorporated herein by reference. In one embodiment of the present disclosure, the student metadata is used for deriving one or more diagnostic metadata of the questions stored in the question database 250.

Figure 3:
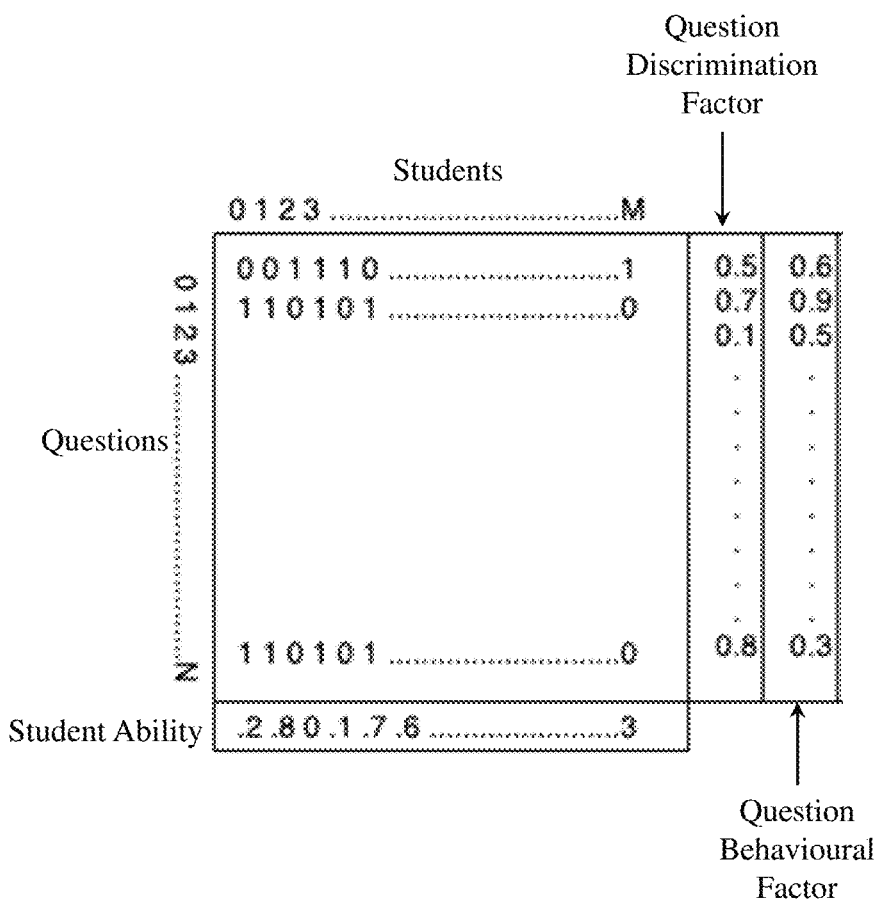
FIG. 3 illustrates the relationship between the question database and the student database in accordance with an embodiment of the present disclosure.

FIG. 3 illustrates relationship between the question database and the student database in accordance with an embodiment of the present disclosure. For ease of description and understating, the questions are represented in the form of a matrix, along with the diagnostic metadata of the question. As shown, the exemplary question database comprises (0 to N) questions and data on the correctness of (0 to M) students' past responses to each question. In this example, zero represents an incorrect response and one represents a correct response. In one embodiment of the present disclosure, the system 105 collects all past responses of M students on N questions along with their correctness and the diagnostic metadata determination module 245 estimates value for student ability, question discrimination factor, and the question behavioral factor, and stores in the question database as shown. The diagnostic metadata also include one or more question attributes such as difficultly level and learning slope which determine the difficulty of questions based on the student ability (achiever students versus the other students). In one embodiment, a student's ability (a latent variable) is estimated from the student's responses to the questions. For example, the student ability may be estimated as the average accuracy on his responses to questions. In another embodiment, statistical measures derived using Item Response Theory (IRT) is used for estimating student ability. As described, the question database 250 comprises a plurality of questions one or more attributes associated with the plurality of questions, and diagnostic metadata and hence the question database is also referred as ground truth dataset, using which, a diagnostic assessment question paper is generated. It is to be noted that the diagnostic metadata may be determined using various other methods disclosed further in the present disclosure.

As described, the system 105 uses the plurality of questions, the one or more attributes associated with the plurality of questions, the diagnostic metadata of the plurality of questions, the one or more constraints received from the user and the one or more policies selected by the use for selecting an optimal set of questions, and hence for generating a diagnostic assessment question paper. The way the diagnostic assessment question paper is generated is described in detail referring to FIG. 2 and FIG. 4.

Figure 4:
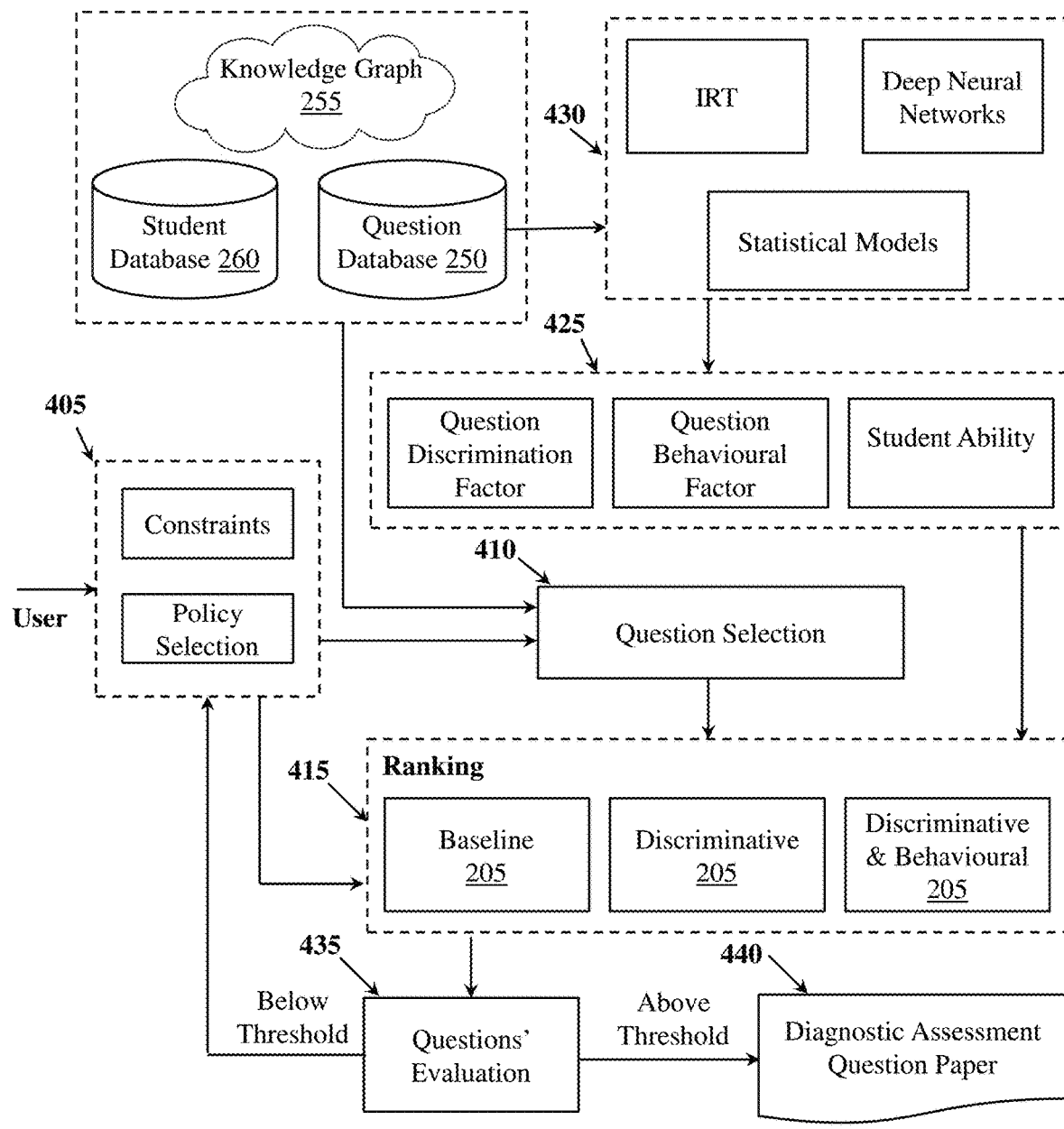
FIG. 4 illustrates a method of generating a diagnostic assessment question paper in accordance with an embodiment of the present disclosure.

FIG. 4 illustrates a method of generating diagnostic assessment question paper in accordance with an embodiment of the present disclosure. As shown at step 405, a user may define one or more constraints using the web interface or a dedicated application installed on the user device 115 and select one or more policies for generating a diagnostic assessment question paper. In one embodiment, the one or more constraints are the constraints on the attributes of the question to be selected for the diagnostic assessment question paper. In other words, the one or more constraints define the requirement of the diagnostic assessment question paper in terms of question attributes. For example, if a user wants to generate a diagnostic assessment question paper with a difficulty level ranging from 1 to 10, and from four chapters, then the constraints are difficulty level (1-10) and chapter distribution (1-4). It is to be noted that the grade, subject or any such category may be selected, using the user interface, before defining the constraints or such selection may be one of the constraints. In another example, the one or more constraints may be defined to select questions at least five questions from multiple choice questions from first five chapters of physics and each question having a minimum difficulty level of five. In yet another example, the one or more constraints may be defined to select at least five questions from concepts related to thermodynamics, the questions having difficulty level ranging between five and eight. Similarly, the user may define various constraints based on the requirements of the diagnostic assessment question paper in terms of question attributes. Further, the user may select one or more policies for optimizing the selection, wherein the one or more policies include a baseline policy, a discriminative policy, and a discriminative and behavioral policy.

Referring to FIG. 2, on receiving the one or more constraints from the user device 115, the constraint analyser module 220 analyses the one or more constraints to derive the one or more attributes associated with the one or more constraints, and the constraints on the attributes are fed to the question selection module 225. In one embodiment, the question selection module 225 is configured for selecting questions from the plurality of questions stored in a question database 250 based on attributes associated with each question and the one or more constraints received from the user. That is, the question selection module 225 compares the attributes associated with the one or more constraints and the one or more attributes associated with the plurality of questions stored in the question database and selects the questions having matching attributes, as shown at step 410.

Considering exemplary constraints of—at least five questions from multiple choice questions from first five chapters of physics and each question having a minimum difficulty level of five, the question selection module 225 may select fifty questions from the plurality of questions stored in the question database 250. In another example, considering the constraints of—at least five questions from concepts related to thermodynamics, question having difficulty level ranging between five and eight,—the question selection module 225 may refer to the knowledge graph 255 and the question database 250 to select all or a plurality of questions from the concepts related to thermodynamics and having difficulty level ranging between five and eight. A knowledge graph typically provides relationship between concepts and may be illustrated as a plurality of interlinked nodes, wherein each node represents a concept. The way the knowledge graph is constructed and used is described in detail in the Indian patent application numbered "201941012401" and the U.S. application Ser. No. "16/586,512", entitled "System and Method for Recommending Personalized Content Using Contextualized Knowledge Base", having priority date of: Mar. 29, 2019, the relevant content of which is incorporated herein by reference.

As described, the question selection module 225 may select a plurality of questions from the question database based on the constraints defined by the user. However, as described, a diagnostic assessment question paper should be able to accurately estimate the ability level of the learners for the skill set being evaluated and be able to discriminate between learners of different abilities and be able to meet the above said objectives (accuracy and discrimination) using as small a number of questions as possible. Hence, the questions are further filtered using ranking method for selecting as small a number of questions as possible, as shown at step 415.

Referring to FIG. 2, the ranking module 230 is configured for ranking the questions selected by the question selection module 225 and selecting a set of questions, from the selected questions, having higher ranks. In one embodiment of the present disclosure, the ranking module 230 ranks the selected questions based on the one or more policies selected by the user, the metadata of students, and the diagnostic metadata of the selected questions, and then selects a set of question having higher ranks. The set of questions (a question paper) is evaluated further and selected as a diagnostic assessment question paper based on a result of evaluation. Hence, the input to the ranking module 230 are the questions selected by the question selection module 225, the one or more policies selected by the user and the diagnostic metadata 425 associated with the selected questions, as shown in FIG. 4.

In one embodiment of the present disclosure, the diagnostic metadata determination module 250 determines the diagnostic metadata 425 of the questions using one or more models 430 as shown in FIG. 4. As described, the student's ability is estimated from the student's responses to the questions. In one implementation, the student ability may be estimated as the average accuracy on his responses to questions. In another implementation, statistical measures derived using Item Response Theory (IRT) is used for estimating student ability. Referring to FIG. 3, student ability is computed for all the students considering the questions attempted by the students. As shown, in one example, the ability of student 1 is 0.8 indicating 80% accuracy on the questions attempted.

Figure 5:
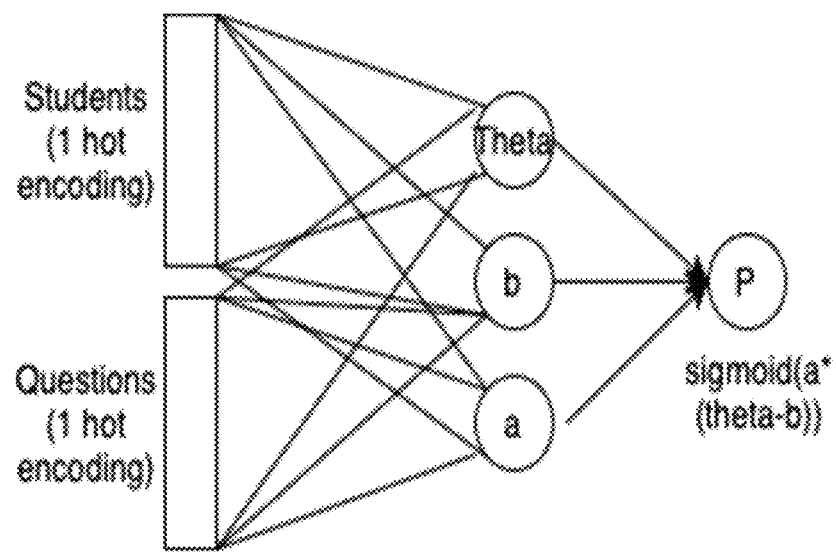
FIG. 5 illustrates an exemplary architecture of a fully connected deep neural network for IRT model.

In yet another embodiment, a fully connected deep neural network is used for estimating the values of student ability and the question discrimination factor. FIG. 5 illustrates an exemplary architecture of a fully connected deep neural network for IRT model. As shown, the inputs to the neural network are one-hot encodings of the student and question vectors, and the output is the correctness of the student's response to that question, which is a binary value. The IRT parameters are estimated by fitting the fully connected deep neural network using Binary Cross Entropy (BCE) loss. As described, the question database stores the plurality of questions, the attributes, and diagnostic metadata of questions, wherein the diagnostic metadata of questions may be derived using one or more ways as described in the present disclosure. It is to be noted that a person skilled in the art may use similar techniques for estimating the IRT parameters.

As described, the one or more behavioral attributes are determined using activity data of the students (learners) and the context of the activity and the behavioral data is tagged with the questions stored in the question database 250. In one embodiment of the preset disclosure, question behavioral factor is estimated by taking the maximum behavioral percentile score of the question for each behavioral parameter, wherein the behavioral percentile score is the percentile score of:

$$\frac{\text{Number of times a specific behaviour was shown on the question}}{\text{Total number of times the question was attempted}}$$

It is to be noted that the behavioral percentile score is normalized between 0 and 1. The behavioral percentile score is computed, for each question and for each behavioral parameter like careless mistakes, overtime incorrect, overtime correct, not attempted, etc. In other embodiment, the question behavioral factor may be the weighted average of behavioral percentile score over each behavioral parameter. In another embodiment of the present disclosure, the question behavioral factor for some of the behavioral attributes may be derived directly from the specific behavior parameter, like careless mistakes.

As described, the ranking module 230 ranks the selected questions based on the one or more policies selected by the user, the metadata of students, and the diagnostic metadata of the selected questions and selects a set of questions having higher ranks. The one or more policies include a baseline policy, a discriminative policy, a discriminative and behavioral policy.

In one embodiment of the present disclosure, if the user selected policy is the baseline policy, the ranking module 230 selects a set of questions by randomly selecting over the question attributes ensuring a mix of difficulty levels and syllabus coverage. Hence, the set of questions selected using the baseline policy meets the constraints requirement defined by the user with set of questions having mix of difficulty levels and the syllabus coverage.

In another embodiment, if the user selected policy is the discriminative policy, the ranking module 230 ranks the questions selected by the question selection module 225 based on the values of the discrimination factor for each given difficulty level. For example, considering the fifty questions selected by the question selection module 225, the ranking module 230 ranks the fifty questions based on value of their discrimination factors. Then, a set of questions (for example, 8 questions) having higher values of discrimination factor are selected, for example 8 questions having discrimination factor ranging from (0.6 to 0.8). Hence, the discriminative policy ensures that high discriminative questions are selected, at any given difficulty level.

In another embodiment, if the user selected policy is the discriminative and behavioral policy, the ranking module 230 ranks the selected questions based on the behavioral factors of the questions tagged with the questions along with the discrimination factor and selects a set of questions having higher ranks. For example, considering the fifty questions selected by the question selection module 225, the ranking module 230 ranks and selects a set of questions that are likely to be fast and incorrect (a behavioral factor) and having higher discrimination factors. This policy ensures that high discrimination questions as well as student behavior are considered while ranking and selecting a set of questions.

As described with reference to FIG. 2 and FIG. 4, the questions are selected based on the one or more constraints defined by the user. Then the selected questions are ranked using one of the policies and a set of questions having higher ranks are selected. The set of questions (a question paper) are evaluated for accuracy and discrimination measures, and based on the result of evaluation, the diagnostic assessment question paper is generated considering the set of questions or the questions are ranked again considering an alternative policy or the process is repeated with a new set of constraints from the user. The term accuracy measure as described herein refers to and defines how closely the diagnosed ability of a student's responses to the set of questions (the question paper) corresponds to the actual ability of the student. The term discrimination measure refers to the measurement of how successful the set of questions (the question paper) is in discriminating between students of different abilities.

Referring to FIG. 2 and FIG. 4, at step 435, the question evaluation module 235 evaluated the set of questions for accuracy and discrimination measures. In one embodiment of the present disclosure, abilities of a set of students are estimated, using IRT, considering the set of questions and then a root mean square error of the estimated abilities and ground truth abilities of the set of students are computed which is value of the accuracy measure. In other words, root mean squared error (RMSE) between student ability data in the ground truth dataset and the inferred student ability (considering the set of questions) is used as a measure of accuracy.

That is, data pertaining to a subset of M students (evaluation student set, refer to FIG. 3), taken from the ground truth dataset is used for computing the value of the accuracy measure. The IRT model is used for predicting the probability of each student in the evaluation set M answering the questions correctly. Further, the student's inferred accuracy is estimated using the IRT models over the selected set of questions by taking an average probability of answering the selected set of question. Further, the ground truth ability of each student is retrieved from the question database 250, which is determined from the IRT model as described. Then the RMSE between the ground truth ability and inferred ability is calculated to get a measure of the accuracy. Lower the RMSE, higher is the accuracy of the set of questions.

In another embodiment of the present disclosure, statistical method such as rank correlation between the ground truth abilities and the inferred abilities are used for measuring the accuracy of the set of questions (the question paper). In this method, the abilities of the subset of M students obtained from the ground truth data and from the set of questions are sorted, and the rank correlation (Spearman's) is determined between the abilities. Higher the correlation, higher is the accuracy of the set of question.

In yet another embodiment of the present disclosure, scatter plot method is used for measuring the accuracy (value of accuracy measure) of the set of questions. The abilities of the subset of M students from the ground truth are plotted against the inferred abilities. The degree of scatter is measured, which is provides a value on how much the ability matches the inferred ability.

In one embodiment, distribution of scores obtained by the subset of M students attempting the generated set of question is used as a measure of discrimination. That is, data pertaining to a subset of M students from the ground truth data is considered and scores are computed, using IRT for example, considering the set of questions. The distribution of score is defined as SH-SL, where SH is score at $H^{th}$ percentile and SL is score at $L^{th}$ percentile and H>L. This provides a value for the discrimination measure.

It is to be noted that a person skilled in the art may implement other known statistical methods for determining the value of accuracy and discrimination measures of the set of questions, and hence for measuring the quality.

Upon computing the values for accuracy measures and the discrimination measures, the evaluation module 235 compares the values with a predefined value (threshold value) for accuracy measures and the discrimination measures. If the computed values are higher than the predefined values, the evaluation module 235 selects the set of questions for generating the diagnostic assessment question paper 440, as shown at step 435, and the question paper generation module 240 generates the diagnostic assessment question paper by including the set of questions. Else, that is, if the computed values are equal or lower than the predefined values, a feedback is sent to the user to select an alternative policy or to modify and add the constraints. Then, the process is repeated to select an alternative set of questions or to add or delete questions from the set of questions for generating a diagnostic assessment question paper.

Figure 6:
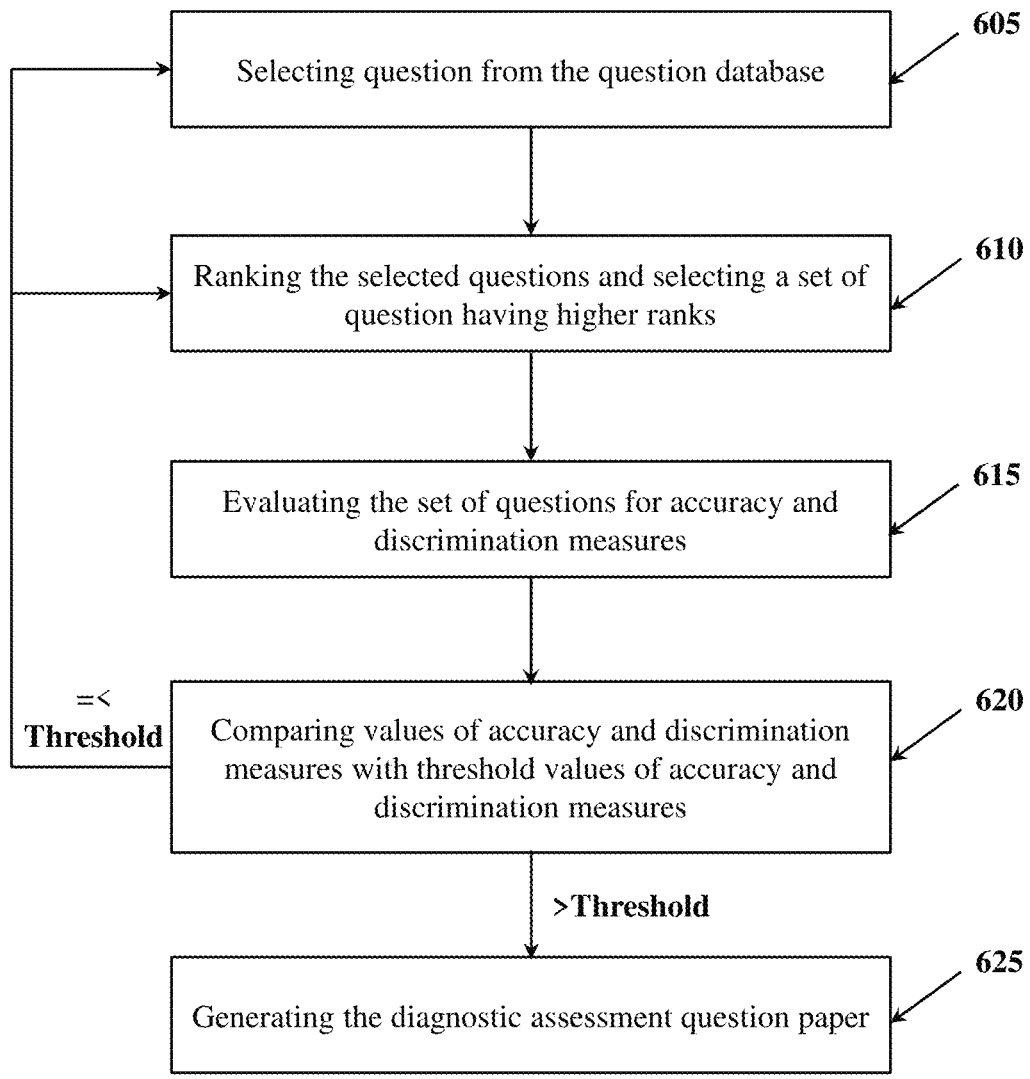
FIG. 6 is a simplified flowchart showing a method for generating the diagnostic assessment question paper in accordance with an embodiment of the present disclosure.

FIG. 6 is a simplified flowchart showing a method for generating the diagnostic assessment question paper in accordance with an embodiment of the present disclosure. At step 605, the question selection module 225 selects questions from the plurality of questions stored in the question database 250. As described, the questions are selected based on the one or more constraints received from the user and the one or more attributes associated with the plurality of question stored in the question database 250.

As described, a diagnostic assessment question paper should be able to accurately estimate the ability level of the learners for the skill set being evaluated, should be able to discriminate between learners of different abilities, and should be able to meet the above said objectives (accuracy and discrimination) using minimum number of questions as possible. Hence, the selected questions are further filtered by ranking using one or more policies.

At step 610, the ranking module 230, ranks the selected questions and selects a set of question having higher ranks. As described, the selected questions are ranked based on the one or more policies selected by the user, the metadata of students, and the diagnostic metadata of the selected questions, and then a set of question having higher ranks are selected, this forms a question paper.

At step 615, the evaluation module 235, evaluates the set of questions for accuracy and discrimination measures, wherein evaluation comprises computation of values of accuracy and discrimination measures for the set of questions. As described, the values are computed considering the data pertaining to a subset of M students from the ground truth data.

At step 620, the evaluation module 235, compares the computed values of accuracy and discrimination measures with threshold values of accuracy and discrimination measures. If the computed values for the set of questions are greater than the threshold values, then the set of questions are considered for generating the diagnostic question paper as shown at step 625. Else, the control passes to one of the steps 605 or the step 610 to repeat the process considering alternative constraints or policies. If the computed values for the set of questions are greater than the threshold values, then the question paper generation module 240 generates a diagnostic assessment question paper by including the set of questions. The generated diagnostic assessment question paper presented on the user device 110 in any of the known formats.

As described, the system and method disclosed in the present disclosure may be used for generating diagnostic assessment question papers which meets requirements of accuracy and discrimination using minimum number of questions as possible. Hence, the diagnostic assessment question paper generated using the proposed system enables efficient diagnosis of ability level of the learner for the skill set being evaluated and discriminates between learners of different abilities.

The diagnostic assessment question paper may be used for evaluating learners' skill set or ability at the beginning of a unit or topic, for diagnosing the individual learner difficulties, curriculum planning, for gaining an idea of what learners have learned in the previous or past learning period, and guiding the learners to achieve their goals, etc.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. A method for generating a diagnostic assessment question paper, the method comprising:
   receiving one or more constraints from a user device associated with a user;
   selecting questions from a plurality of questions stored in a question database, the selection based on attributes associated with each question and the one or more received constraints;
   receiving one or more policies selected by the user, wherein the one or more policies include a baseline policy, a discrimination policy, a discrimination, and a behavioral policy;
   ranking the selected questions based on the one or more policies selected by the user, metadata of students, and diagnostic metadata of selected questions;
   selecting a set of questions having higher ranks;
   evaluating the set of questions for accuracy and discrimination measures, wherein the evaluation comprises computing values of accuracy and discrimination measures for the set of questions, wherein computing the value of accuracy comprises:
   estimating abilities of a set of students, using IRT, considering the set of questions; and
   computing root mean square error of the estimated abilities and ground truth abilities of the set of students; and
   generating the diagnostic assessment question paper by selecting the set of questions, if the values for the accuracy and the discrimination measures are higher than predefined values of accuracy and discrimination.

2. The method as claimed in claim 1, wherein the one or more constraints are the constraints on the attributes of the question.

3. The method as claimed in claim 1, wherein the diagnostic metadata of questions is determined using one or more of item response theory (IRT), deep neural networks, and statistical methods.

4. The method as claimed in claim 1, wherein computing the value of discrimination comprises:
   estimating scores for a set of students considering the set of questions; and
   computing difference between scores at two percentiles, wherein difference is the value of discrimination.

5. The method as claimed in claim 1 wherein the method is repeated using one or more alternative constraints or alternative policy, or both, received from the user, if the values for the accuracy and the discrimination measures are lower than or equal to the predefined values of accuracy and discrimination.

6. A system (105) for generating a diagnostic assessment question paper, the system (105) comprising:
- a constraint analyser module (220) configured for receiving one or more constraints from a user device (110) associated with a user and one or more policies selected by the user;
- a question selection module (225) configured for selecting one or more questions from a plurality of questions stored in a question database (250), the selection is based on attributes associated with each question and the one or more received constraints;
- a ranking module (230) configured for:
  - ranking the selected questions based on the one or more policies selected by the user, metadata of students, and diagnostic metadata of selected questions;
  - selecting a set of questions having higher ranks;
- an evaluation module (235) configured for:
evaluating the set of questions for accuracy and discrimination measures, wherein the evaluation comprises computing values of accuracy and discrimination measures for the set of questions, wherein computing the value of accuracy comprises:
- estimating abilities of a set of students, using IRT, considering the set of questions; and
- computing root mean square error of the estimated abilities and ground truth abilities of the set of students;
- comparing the computed values for the accuracy and the discrimination measures with predefined values of accuracy and discrimination; and
- a question paper generation module (240) configured for generating the diagnostic question paper by including the set of question.

7. The system (105) as claimed in claim 6, wherein the one or more policies include baseline policy, a discrimination policy, a discrimination, and behavioral policy.

8. The system (105) as claimed in claim 6, wherein the diagnostic metadata of questions is determined by a diagnostic metadata determination module (245) using one or more of item response theory (IRT), deep neural networks, and statistical methods.

* * * * *